United States Patent [19]

Tholema et al.

[11] 4,212,746

[45] Jul. 15, 1980

[54] EDGE SEALING FOR FILTER CLOTHS

[75] Inventors: Edzard Tholema, Odenthal; Heinz-Gerd Nonnenbruch, Leverkusen; Hans Gossmann, Bergisch-Gladbach; Peter Schultz, Leverkusen, all of Fed. Rep. of Germany

[73] Assignee: Bayer Aktiengesellschaft, Leverkusen, Fed. Rep. of Germany

[21] Appl. No.: 973,302

[22] Filed: Dec. 26, 1978

[30] Foreign Application Priority Data

Jan. 5, 1978 [DE] Fed. Rep. of Germany ....... 2800453

[51] Int. Cl.$^2$ ............................................. B01D 29/04
[52] U.S. Cl. ..................................... 210/495; 55/502; 55/511; 210/507

[58] Field of Search .......................... 55/502, 511, 108; 428/193, 194; 210/483, 495, 499, 504, 506, 507, 508

[56] References Cited

U.S. PATENT DOCUMENTS

| 2,601,597 | 6/1952 | Daniel et al. | 210/508 |
|---|---|---|---|
| 2,601,598 | 6/1952 | Daniel et al. | 210/508 |
| 2,854,351 | 9/1958 | Wilson | 428/193 |

*Primary Examiner*—Frank Sever
*Attorney, Agent, or Firm*—Sprung, Felfe, Horn, Lynch & Kramer

[57] ABSTRACT

If the edge of a filter cloth is coated with one or more layers of a polychloroprene latex mixture which contains zinc oxide and a silicate filler in addition to a polychloroprene with carboxyl groups, sticking is so greatly reduced that the durability of the filter cloths is substantially increased.

4 Claims, 1 Drawing Figure

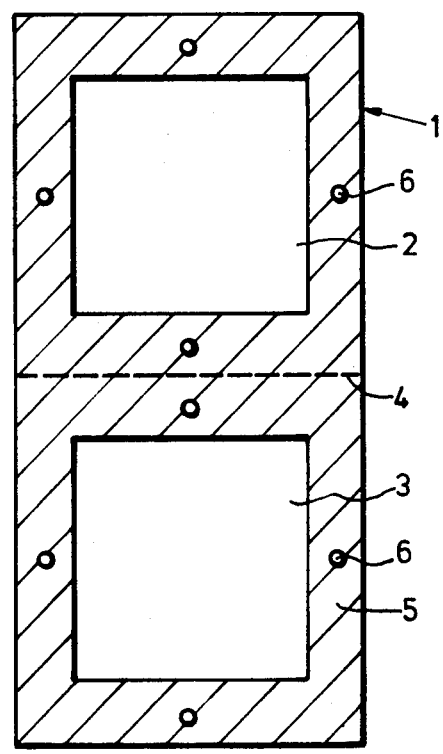

EDGE SEALING FOR FILTER CLOTHS

This invention relates to filter cloths or filter felts with a sealing edge of a polychloroprene latex mixture and to a process for their manufacture.

Filter cloths and filter felts in which the edge is coated with polychloroprene are already known but the known edge coating does not sufficiently prevent the capillary action of the fabric and causes a lot of sticking in operation so that gases and/or liquids are liable to escape from the filter press. The sticking of the coatings seriously impairs their proper function and durability. Methods such as powdering with talcum after each operation are employed to counteract sticking.

It has now been found that filter cloths and filter felts which have a sealing edge of a polychloroprene latex mixture have advantageous properties if the polychloroprene latex mixture contains from 2 to 40% by weight, preferably from 15 to 20% by weight of zinc oxide and from 0 to 50% by weight, preferably from 10 to 20% by weight of a silicate filler in addition to a polychloroprene with carboxyl groups. The invention relates to filter cloths or filter felts in which the sealing edge consists of a polychloroprene latex mixture having a particular composition. It also relates to a process for the manufacture of filter cloths or filter felts having a special sealing edge.

Filter cloths of yarns spun from monofil, multifil and/or staple fibres and filter felts, for example of polypropylene-polyamide, polyesters, polyacrylonitrile, viscose, cotton, coconut fibre, sisal, hemp or mixtures of these can be equipped with a perfectly sealing edge by the method indicated above.

The sealing edge may be applied by brush coatings, slop padding, spraying or immersion. Immersion, brush coating and slop padding are preferred. The polychloroprene latex mixture is preferably applied in several successive stages to the edge of the filter cloth or felt, using a mixture of higher viscosity with each stage. It is particularly preferred to employ a process in which the chloroprene latex mixture is applied to the edge of the filter cloth in two stages, using a viscosity of from 50 to 260 cP in the first mixture and of 260 to 650 cP in the second mixture, measured in each case with a Haake-Viscosimeter.

Cross linking of the polychloroprene with zinc oxide alone is sufficient although sulphur and other vulcanization accelerators may be added. Vulcanization with sulphur improves resistance to acids and alkalis. Kaolin, chalk or carbon black may be used instead of the silicate filler. To what extent it is suitable to use these substitutes depends on the type of filtration work for which the filters are to be used. With high zinc oxide contents, the silicate filler may be omitted without using a substitute.

A filter cloth according to the invention is illustrated in the drawing and described in detail below.

The filter cloth 1 is composed of two separately produced parts 2, 3 joined together by a seam 4. Its size may vary within a wide range and depends on the filter press employed. The width of a coating 5 is adapted to the width of the frame and is normally in the region of 10 cm. The presence of 8 apertures 6 in the sealing edge of the filter cloths is due to the process hitherto employed for applying the edge coating, and it does not impair the sealing effect. In this example, the coating edge of each half 2 and 3 of the filter cloth is placed over a frame. The upper part of the frame has two pins which are set at the same distance apart as two corresponding apertures in the cloth and the cloth may be suspended on them. The filter cloth overhangs the frame on both sides and when the frame is lowered to a stop in a tank which has been filled to a given height with the polychloroprene latex mixture, the filter cloth dips into the mixture on both sides and is impregnated by it. The frame is then raised and dried in the air. The square filter cloth is then turned through 90° and the two other edges are coated.

It has been found particularly advantageous to dip the edges of the filter cloth into another chloroprene latex mixture of higher viscosity after the cloth has been dried. By "low viscosity" is meant a viscosity in the range of from 50 to 260 cP, and a relatively high viscosity is understood to be one within the range of from 260 to 650 cP, measured in each case with a Haake-Viscosimeter. It is particularly simple to measure the viscosity with a Ford cup. In a Ford cup with a nozzle, the outflow of time of the low viscosity mixture is approximately 5 to 20 seconds, while that of the more highly viscous mixture, using the same measuring device, is from 20 to 40 seconds.

The composition of the chloroprene latex mixtures in the examples is shown in the table. The numbers denote parts by weight.

|  | A | B | C | D | E |
|---|---|---|---|---|---|
| (a) Carboxylated polychloroprene latex 50% | 200 | 200 | 200 | 200 | 200 |
| (b) Zinc oxide | 10 | 15 | 20 | 30 | 40 |
| (c) Silicate filler | 20 | 15 | 10 | 10 | 0 |
| (d) Ethylene thiourea | 2 | 2 | 2 | 2 | 2 |
| Diphenyl guanidine | 1 | 1 | 1 | 1 | 1 |
| Colloidal sulphur | 1 | 1 | 1 | 1 | 1 |
| (e) Dispersing agent | 30 | 30 | 30 | 30 | 30 |
| (f) Thickener |  |  |  |  |  |
| low viscosity ca. | 1 | 1 | 1 | 1 | 1 |
| high viscosity ca. | 5 | 5 | 5 | 5 | 5 |
| (g) Aminic age resistor | 1.5 | 1.5 | 1.5 | 1.5 | 1.5 |

The carboxylated polychloroprene latex used was ®Bayprenlatex 4R. The silicate filler used was precipitated silicic acid. Ethylene thiourea, diphenyl guanidine and colloidal sulphur are well known accelerators. The dispersing agent used was a 5% aqueous solution of methylene-bis-napthalene sulphonic acid sodium. The thickener based on polyacrylate was a 25% aqueous solution, a trade product marketed under the name ®Collacral VL.

The filter cloths obtained by immersing cloths twice in the polychloroprene latex mixture according to the invention, were completely liquid-tight and gas-tight. When the filter press was opened, the filter cloths did not stick together.

What we claim is:

1. In a filter cloth or filter felt having sealing means comprising a polychloroprene latex mixture disposed around the periphary thereof surrounding an unsealed portion for providing thereat means for preventing capillary action of the filter cloth or felt from the unsealed portion to the sealed portion thereby preventing the escape of fluids, the improvement wherein the polychoroprene latex mixture of the means for preventing capillary action contains from 2 to 40% by weight of zinc oxide and from 0 to 50% by weight of a silicate filler in addition to a polychloroprene with carboxyl groups.

2. Filter cloth or filter felt according to claim 1, wherein the silicate filler is replaced by kaolin, chalk, carbon black or higher zinc oxide contents.

3. Filter cloth or filter felt according to claims 1 or 2, wherein the polychloroprene latex mixture contains vulcanization accelerators.

4. The filter cloth or filter felt according to claim 1, wherein the polychloroprene latex mixture contains from 15 to 20% by weight of zinc oxide and from 10 to 20% by weight of a silicate filler.

* * * * *